(12) United States Patent
Thaler et al.

(10) Patent No.: US 10,722,799 B2
(45) Date of Patent: Jul. 28, 2020

(54) FANTASY SPORTS DATA ANALYSIS FOR GAME STRUCTURE DEVELOPMENT

(71) Applicant: OATH INC., New York, NY (US)

(72) Inventors: Justin Thaler, New York, NY (US); Maxim Sviridenko, New York, NY (US); Edo Liberty, New York, NY (US); Prerit Uppal, Sunnyvale, CA (US); Ron Belmarch, Los Angeles, CA (US); Jerry Shen, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/276,855

(22) Filed: Feb. 15, 2019

(65) Prior Publication Data

US 2019/0176042 A1 Jun. 13, 2019

Related U.S. Application Data

(62) Division of application No. 14/876,101, filed on Oct. 6, 2015, now Pat. No. 10,207,188.

(51) Int. Cl.
*A63F 13/65* (2014.01)
*G07F 17/32* (2006.01)

(52) U.S. Cl.
CPC .......... *A63F 13/65* (2014.09); *G07F 17/3244* (2013.01); *G07F 17/3276* (2013.01); *G07F 17/3288* (2013.01)

(58) Field of Classification Search
CPC .. A63F 13/65; G07F 17/3244; G07F 17/3276; G07F 17/3288

USPC ........................................................ 463/25
See application file for complete search history.

(56) References Cited

U.S. PATENT DOCUMENTS

| | | |
|---|---|---|
| 2006/0052159 A1 | 3/2006 | Cahill et al. |
| 2007/0202943 A1 | 8/2007 | Thomas |
| 2008/0139305 A1 | 6/2008 | Vallejo et al. |
| 2012/0088576 A1 | 4/2012 | Shepherd et al. |
| 2012/0231878 A1 | 9/2012 | Angelo |
| 2013/0252704 A1 | 9/2013 | Gilbertson et al. |
| 2013/0281170 A1 | 10/2013 | Weiss et al. |
| 2014/0229866 A1* | 8/2014 | Gottlieb ................ H04L 65/403 715/758 |
| 2015/0273345 A1* | 10/2015 | Ford ..................... A63F 13/828 463/31 |
| 2015/0279164 A1 | 10/2015 | Miller et al. |

* cited by examiner

*Primary Examiner* — Allen Chan
(74) *Attorney, Agent, or Firm* — James J. DeCarlo; Greenberg Traurig, LLP

(57) ABSTRACT

In an aspect, fantasy sports data is analyzed to generate and/or manage the delivery of and user experience of fantasy sports games and contests, including timing and payout structure(s) for short-term fantasy contests, such as daily, weekly, etc. fantasy sports contests, that motivate and appeal to contestants and is/are reasonably structured and concisely represented. In yet another aspect, a daily fantasy contest system is provided to automatically adjust to user demand without overshooting profitable levels and offer a variety of different contests, as well as offer contests with guaranteed and non-guaranteed payouts.

18 Claims, 10 Drawing Sheets

PRIZE POOL (B): $3000;
FIRST PRIZE ($P_1$): $300;
NUMBER OF WINNERS (N): 853;
SMALLEST PRIZE (E): $2

| BUCKET NO. | BUCKET SIZE | PRIZE AMOUNT | WINNING PLACES |
|---|---|---|---|
| 1 | 1 | $300 | 1-1 |
| 2 | 1 | $200 | 2-2 |
| 3 | 1 | $125 | 3-3 |
| 4 | 1 | $80 | 4-4 |
| 5 | 1 | $45 | 5-5 |
| 6 | 2 | $40 | 6-7 |
| 7 | 2 | $25 | 8-9 |
| 8 | 7 | $15 | 10-16 |
| 9 | 12 | $10 | 17-28 |
| 10 | 14 | $6 | 29-41 |
| 11 | 15 | $5 | 42-56 |
| 12 | 148 | $3 | 57-204 |
| 13 | 649 | $2 | 205-853 |

Fig. 4

Problem 3.1 (Payout Structure Optimization). *For a given set of ideal payouts* $\{\pi_1, \ldots, \pi_N\}$ *for* $N$ *contest winners, a total prize pool of* $B$, *and minimum payout* $E$, *find* $(S_1, \ldots, S_r, \Pi_1, \ldots, \Pi_r)$ *to optimize:*

$$\min \sum_{j=1}^{r} \sum_{i \in S_j} (\pi_i - \Pi_j)^2 \quad \text{subject to:}$$

$$E \leq \Pi_r < \Pi_{r-1} < \cdots < \Pi_1, \quad \text{(Monotonicity \& Min. Payout Requirement)}$$

$$\sum_{j=1}^{r} \Pi_j |S_j| = B, \quad \text{(Prize Pool Requirement)}$$

$$\Pi_j \text{ is a "nice number"}, \quad j = 1, \ldots, r, \quad \text{(Nice Number Requirement)}$$

$$\sum_{j=1}^{r} |S_j| = N, \quad \text{(Ensure Exactly N Winners)}$$

$$|S_1| \leq |S_2| \leq \cdots \leq |S_r|, \quad \text{(Monotonic Bucket Sizes)}^*$$

*where* $S_j = \{\sum_{i<j} |S_i| + 1, \sum_{i<j} |S_i| + 2, \ldots, \sum_{i\leq j} |S_i|\}$ *for* $j = 1, \ldots, r$.

*\*Note that it is perfectly allowable to set $S_1 = \emptyset$, $S_2 = \emptyset$, etc. which corresponds to choosing a payout structure with fewer buckets than the maximum allowed.*

Problem 4.1 (Payout Structure Integer Program). *For a given set of ideal payouts $\{\pi_1, \ldots, \pi_N\}$, a total prize pool of $B$, a given set of acceptable prize payouts $\{p_1 > p_2 > \ldots > p_m\}$, and an allowed budget of $r$ buckets solve:*

$$\min \sum_{i \in [N], j \in [r], k \in [m]} x_{i,j,k} \cdot (\pi_i - p_k)^2 \quad \text{subject to:}$$  (602)

Problem constraints:

$$\sum_{k \in [m]} (k + 1/2) \cdot z_{j,k} - k \cdot z_{j+1,k} \leq 0, \quad j \in [r-1],$$  (Monotonicity Requirements)

$$\sum_{i \in [N], j \in [r], k \in [m]} x_{i,j,k} \cdot p_k = B,$$  (Prize Pool Requirement)

$$\sum_{k \in [m]} z_{j,k} - z_{j+1,k} \leq 0, \quad j \in [r-1],$$  (Monotonic Bucket Sizes)

Consistency constraints:

$$\sum_{j \in [r], k \in [m]} x_{i,j,k} = 1, \quad i \in [N],$$  (One Bucket Per Winner)

$$\sum_{k \in [m]} z_{j,k} \leq 1, \quad j \in [r],$$  (One Price Per Bucket)

$$x_{i,j,k} - z_{j,k} \geq 0, \quad i \in [N], j \in [r], k \in [m].$$  (Price Consistency)

| Contest | Entries/Size | Entry Fee | Prizes | Start (EDT) | |
|---|---|---|---|---|---|
| ⚾ MLB $3000 Guaranteed [$3000 to 1st] (M) (G) | 844/2409 | $1 | $3,000 | Today, 7:05 Pm | Enter contest |
| ⚾ MLB $12.5K Guaranteed [$1250 to 1st] (M) (G) | 452/2840 | $5 | $12,500 | Today, 7:05 Pm | Enter contest |
| ⚾ MLB $2 Double Up [Win $4] (M) (G) | 204/1135 | $2 | $2,000 | Today, 7:05 Pm | Enter contest |
| ⚾ MLB $5 Double Up [Win $10] (M) (G) | 86/454 | $5 | $2,000 | Today, 7:05 Pm | Enter contest |
| ⚾ MLB $10 Double Up [Win $20] (M) (G) | 76/340 | $10 | $3,000 | Today, 7:05 Pm | Enter contest |
| ⚾ MLB $25 Quadruple Up [Win $100] (G) | 21/45 | $25 | $1,000 | Today, 7:05 Pm | Enter contest |
| ⚾ MLB $109 50/50 [Win $200] (G) | 12/30 | $109 | $3,000 | Today, 7:05 Pm | Enter contest |
| ⚾ MLB $25 Double Up [Win $50] (G) | 11/45 | $25 | $1,000 | Today, 7:05 Pm | Enter contest |
| ⚾ MLB $25 Double Up [Win $50] (G) | 10/45 | $25 | $1,000 | Today, 7:05 Pm | Enter contest |
| ⚾ MLB $270 50/50 [Win $500] (G) | 9/20 | $270 | $5,000 | Today, 7:05 Pm | Enter contest |
| ⚾ MLB $25 Double Up [Win $50] (G) | 9/45 | $25 | $1,000 | Today, 7:05 Pm | Enter contest |
| ⚾ MLB $50 Double Up [Win $50] (G) | 7/45 | $50 | $1,000 | Today, 7:05 Pm | Enter contest |
| ⚾ MLB $530 50/50 [Win $1K] (G) | 6/22 | $530 | $7,000 | Today, 7:05 Pm | Enter contest |
| ⚾ MLB $50 Double Up [Win $100] (G) | 5/14 | $50 | $1,000 | Today, 7:05 Pm | Enter contest |
| ⚾ MLB $50 Double Up [Win $100] (G) | 4/22 | $50 | $1,000 | Today, 7:05 Pm | Enter contest |

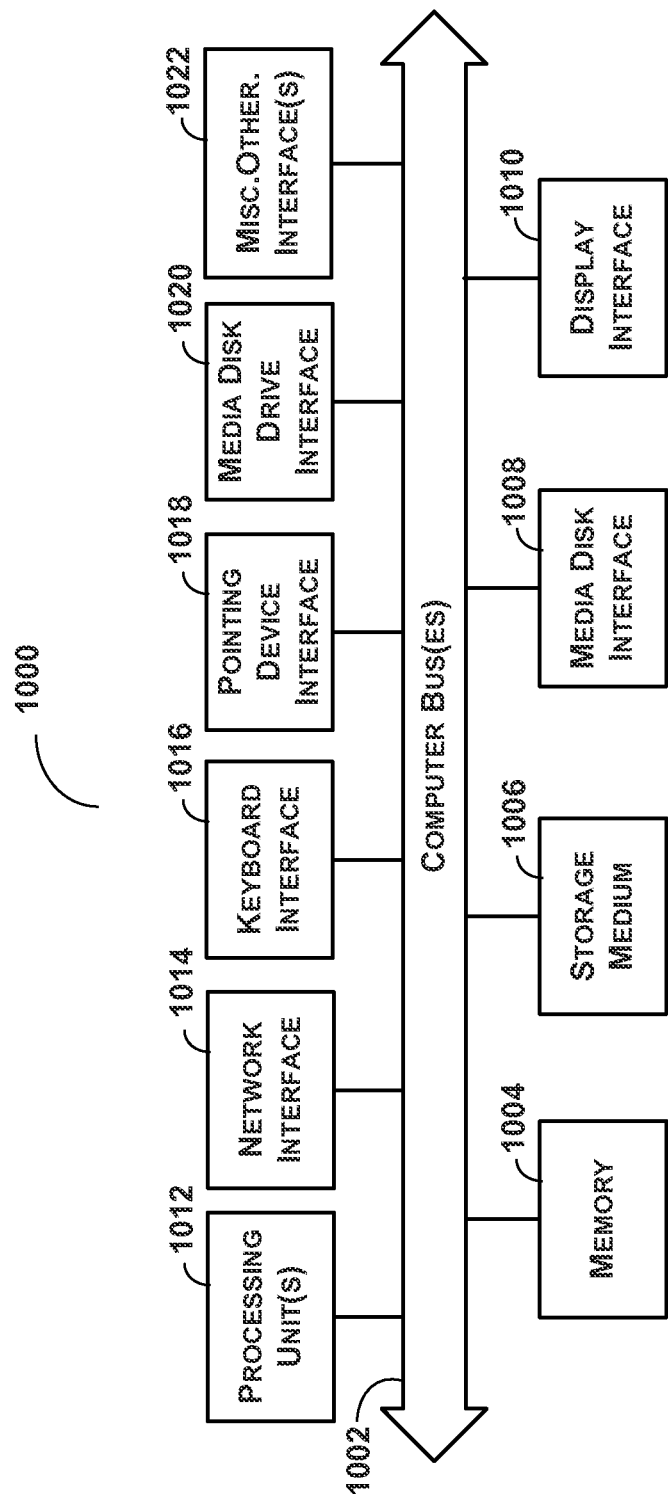

US 10,722,799 B2

FANTASY SPORTS DATA ANALYSIS FOR GAME STRUCTURE DEVELOPMENT

CROSS REFERENCE TO RELATED APPLICATIONS

This application is a division of and claims priority from co-pending U.S. patent application Ser. No. 14/876,101, filed Oct. 6, 2015, entitled FANTASY SPORTS DATA ANALYSIS FOR GAME STRUCTURE DEVELOPMENT, the contents of each of which is hereby incorporated by reference.

FIELD OF THE DISCLOSURE

The present disclosure is generally related to analysis of short-term fantasy sport data for structuring game development contests.

BACKGROUND

Daily fantasy contests are a fast growing market. By way of a non-limiting example, in fantasy sports, participants build a team of real-world athletes, and the team earns points based on the actual real-world performance of the athletes. For example, if a participant in a fantasy basketball league has Lebron James on his or her team, then the user will earn points based on the statistics Lebron James produces in actual basketball games.

SUMMARY

Traditional fantasy sports competitions typically run for an entire professional sports season; daily sports competitions typically run for just a single day or week. The Fantasy Sports Trade Association estimates that more than 56 million people are actively playing traditional fantasy sports in 2015. Online cash prize tournaments, such as short-term (e.g. daily, weekly, series) fantasy sports contests, are quickly becoming a central part of the sports industry. However, there are a number of issues associated with running a large-scale, prize driven, fantasy sports online platform.

The present disclosure seeks to address problems and failings in the art. One aspect of the present disclosure relates to analyzing fantasy sports data to generate and/or manage the delivery of and user experience of fantasy sports games and contests, including timing and payout structure(s) for short-term fantasy contests, such as daily, weekly, etc. fantasy sports contests, that motivate and appeal to contestants and is/are reasonably structured and concisely represented. In yet another aspect, a daily fantasy contest system is provided to automatically adjust to user demand without overshooting profitable levels and offer a variety of different contests, as well as offer contests with guaranteed and non-guaranteed payouts.

In accordance with one or more embodiments, a method is provided, the method comprising obtaining, by a computing device and for a contest, a tentative payout structure comprising a payout amount for each winning place of a number of winning places for the contest; determining, by the computing device, a number of buckets and a size for each bucket indicating how many of the number of winning places to assign to the bucket; and determining, by the computing device, a related payout structure using the tentative payout structure of prize amounts for each winning place, the related payout structure specifying a prize amount for each bucket, each winning place's prize amount being determined by the bucket to which it is assigned and the bucket's prize amount.

In accordance with one or more embodiments, a method is provided, the method comprising creating, by a computing device, an initial number of instances of a contest at a beginning of a contest generation period associated with the contest, each contest instance having a same number of available entry slots for possible contest participants to enter the contest prior to the contest's start time; monitoring, by the computing device, a number of available contest instances to ensure that there are at least a maintenance number of available contest instances for possible contest participants to enter the contest prior to the contest's start time; creating, by the computing device and for a first portion of the contest generation period, an additional instance of the contest to replace a filled contest instance such that there are a maintenance number of available contest instances, the additional contest instance having the same number of entry slots as the filled contest instance; and for a second portion of the contest generation period before the contest's start time: estimating, by the computing device, a number of possible contest participants likely to enter the contest during the second portion of the contest generation period; and creating, by the computing device, an additional instance of the contest to replace the filled contest instance based on an estimated number of possible contest participants likely to enter the contest during the second portion of the contest generation period.

In accordance with one or more embodiments a system is provided, which system comprises at least one computing device, each computing device comprising a processor and a storage medium for tangibly storing thereon program logic for execution by the processor, the stored program logic comprising obtaining logic executed by the processor for obtaining, for a contest, a tentative payout structure comprising a payout amount for each winning place of a number of winning places for the contest; determining logic executed by the processor for determining a number of buckets and a size for each bucket indicating how many of the number of winning places to assign to the bucket; and determining logic executed by the processor for determining a related payout structure using the tentative payout structure of prize amounts for each winning place, the related payout structure specifying a prize amount for each bucket, each winning place's prize amount being determined by the bucket to which it is assigned and the bucket's prize amount.

In accordance with one or more embodiments a system is provided, which system comprises at least one computing device, each computing device comprising a processor and a storage medium for tangibly storing thereon program logic for execution by the processor, the stored program logic comprising creating logic executed by the processor for creating an initial number of instances of a contest at a beginning of a contest generation period associated with the contest, each contest instance having a same number of available entry slots for possible contest participants to enter the contest prior to the contest's start time; monitoring logic executed by the processor for monitoring a number of available contest instances to ensure that there are at least a maintenance number of available contest instances for possible contest participants to enter the contest prior to the contest's start time; creating logic executed by the processor for creating, for a first portion of the contest generation period, an additional instance of the contest to replace a filled contest instance such that there are a maintenance number of available contest instances, the additional contest instance having the same number of entry slots as the filled contest instance; and for a second portion of the contest generation period before the contest's start time: estimating logic executed by the processor for estimating a number of possible contest participants likely to enter the contest during the second portion of the contest generation period; and creating logic executed by the processor for creating an additional instance of the contest to replace the filled contest instance based on an estimated number of possible contest participants likely to enter the contest during the second portion of the contest generation period.

In accordance with yet another aspect of the disclosure, a computer readable non-transitory storage medium is provided, the medium for tangibly storing thereon computer readable instructions that when executed cause at least one processor to obtain, for a contest, a tentative payout structure comprising a payout amount for each winning place of a number of winning places for the contest; determine a number of buckets and a size for each bucket indicating how many of the number of winning places to assign to the bucket; and determine a related payout structure using the tentative payout structure of prize amounts for each winning place, the related payout structure specifying a prize amount for each bucket, each winning place's prize amount being determined by the bucket to which it is assigned and the bucket's prize amount.

In accordance with yet another aspect of the disclosure, a computer readable non-transitory storage medium is provided, the medium for tangibly storing thereon computer readable instructions that when executed cause at least one processor to create an initial number of instances of a contest at a beginning of a contest generation period associated with the contest, each contest instance having a same number of available entry slots for possible contest participants to enter the contest prior to the contest's start time; monitor a number of available contest instances to ensure that there are at least a maintenance number of available contest instances for possible contest participants to enter the contest prior to the contest's start time; create, for a first portion of the contest generation period, an additional instance of the contest to replace a filled contest instance such that there are a maintenance number of available contest instances, the additional contest instance having the same number of entry slots as the filled contest instance; and for a second portion of the contest generation period before the contest's start time: estimate a number of possible contest participants likely to enter the contest during the second portion of the contest generation period; and create an additional instance of the contest to replace the filled contest instance based on an estimated number of possible contest participants likely to enter the contest during the second portion of the contest generation period.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an illustration of components, including contest generation and payout components, in accordance with one or more embodiments of the present disclosure.

FIG. 2 provides an example of a process flow for a heuristic algorithm used in accordance with one or more embodiments.

FIG. 3 provides an example of a leftover distribution process flow for use in accordance with one or more embodiments.

FIG. 4 provides an example of a payout structure determined in accordance with embodiments of the present disclosure.

FIG. 5 provides an illustrative summarization of a payout structure optimization using a heuristic approach in accordance with one or more embodiments of the present disclosure.

FIG. 6 provides an illustrative summarization of a payout structure optimization using an integer programming approach in accordance with one or more embodiments of the present disclosure.

FIG. 7 provides a sample graphical user interface (GUI) screen in accordance with one or more embodiments of the present disclosure.

FIG. 8 provides an example of another graphical user interface (GUI) screen in accordance with one or more embodiments of the present disclosure.

FIG. 10 is a detailed block diagram illustrating an internal architecture of a computing device in accordance with one or more embodiments of the present disclosure.

DETAILED DESCRIPTION

Figure 1:
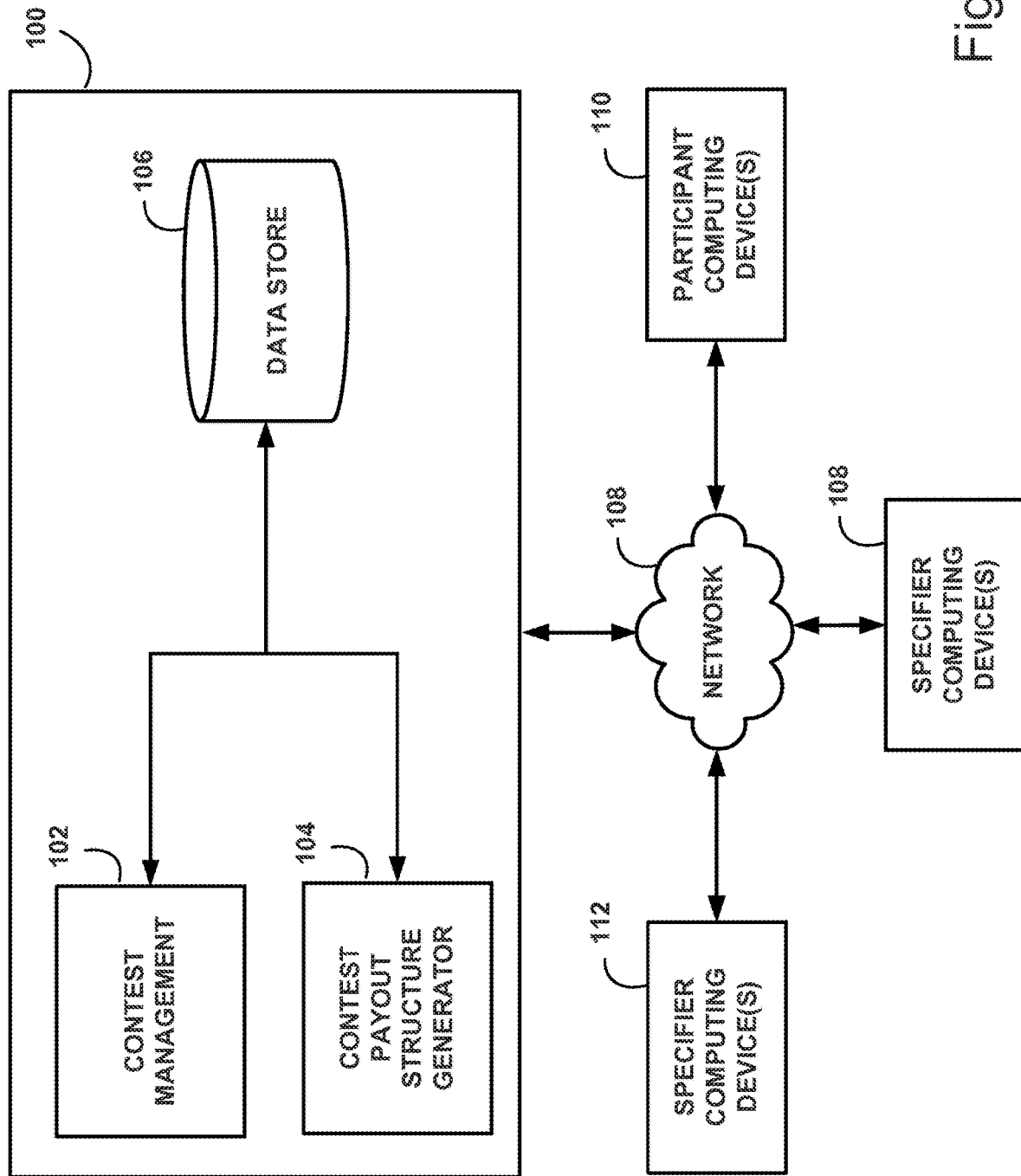

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B. and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a fantasy sports data analysis for game structure development system, method and architecture. Some advantages in connection with embodiments of the present disclosure include without limitation: a) minimizing manual intervention in management and/or payout structure generation; b) automatically adjusting to user demand without overestimating the demand; c) simultaneously handling contests with both guaranteed and non-guaranteed payouts; and/or d) generating contest packages that allow for a high degree of user choice in terms of which contest to join.

The disclosed systems and methods remedy such shortcomings in the art and provide improved computer systems and methods instituting increased functionality to the computer executing the disclosed systems and methods by automatically managing online contests and/or automatically generating a payout structure for an online contest. The automatic creation of online contests and automatic generation of associated payout structures can yield improvements in numerous technological fields, such as for example electronic commerce, including without limitation increased web site traffic and use, increased sales and profits associated with online contests, and online advertising to name a few.

Embodiments of the present disclosure include a contest generation and payout structure system, method and architecture. A contest can be generated and a corresponding payout structure is generated in accordance with contest creation and payout structure generation parameters. Demand for online contests is rapidly growing with many millions of people actively involved at present. Such current and future online demands are addressed by computing devices specifically designed in accordance with one or more embodiments of the present disclosure.

Embodiments of the present disclosure can be used by a web site provider, for example, to make various contests and associated payout structures available to contest participants that visit the provider's web site. Once on the provider's web site, a contest participant can register with the contest provider, view advertisements included on the provider's web site, provide information that may be used in targeting advertisements to the contest participant, etc.

In accordance with one or more embodiments, the contest generation system, method and architecture provides contest participants an ability to participate in fantasy contests, such as sports fantasy contests. Embodiments of the present disclosure can be used to provide short-term contests, such as and without limitation short-term sports fantasy contests, which can run for less than a full season, such as and without limitation on a daily, e.g., one-day competitions, or weekly, e.g., one-week competitions, basis. While embodiments of the present disclosure are described in connection with short-term contests, it should be apparent that embodiments may be used in connection with contests of any duration or time frame, including full season contests.

FIG. 1 provides an illustration of components, including contest generation and payout components, in accordance with one or more embodiments of the present disclosure. In accordance with one or more such embodiments, system 100 is available to various entities, such as and without limitation contest specifiers, contest providers and contest participants. By way of a non-limiting example, system 10 might be provided by a contest provider.

System 100 comprises a contest management component, or contest manager, 102, a contest payout structure generation component, or payout structure generator, 104 and data storage 106. System 100 may include a number of server computers, or computing devices. System 100 may be accessible via computer devices, such as and without limitation computing devices 108, 110 and 112 of contest specifiers, contest participants and contest providers, respectively.

Data storage 106 may include a number of physical data storage devices storing data in any structure or format. In accordance with one or more embodiments, data storage 106 can store contest specifications of contest specifiers, contest parameters of contest providers, information about contest participants, information about each contest created by system 100, etc.

In accordance with one or more embodiments, the system 100 receives a contest specification from a contest specifier, such as and without limitation a service provider, website, and/or a sports league, e.g., National Football League (NFL), National Basketball Association (NBA), Major League Baseball (MLB), National Hockey League (NH L), National College Athletic Association (NCAA) football, basketball, etc.). Such a specification comprises information designating a given contest, such as and without limitation an entry fee to be paid by each participant in the contest, contest capacity information, which can identify the number of participants for a given instance of the contest or for all instances of the contest, a payout type, e.g., guaranteed, non-guaranteed, etc., for the contest, prize pool, e.g., total amount of the prize to be apportioned to the contest winner (s), prize breakdown, etc. By way of a non-limiting example, a prize breakdown can indicate how a prize pool is divided, apportioned or allocated between the winning users.

Using system 100, a contest provider can specify, for each sports league, rules of a corresponding fantasy game, or contest, such as and without limitation, what constitutes a valid fantasy team, how real-world athletes accumulate points in the game, etc. A contest provider may also provide information used to set parameters for contest creation and regeneration, such as and without limitation a number of contest instances to be initially created and a number of unfilled contest instances available. In accordance with one or more embodiments, a contest provider may provide information indicating how risk prone or risk averse the provider would like to be, whether to use a flat or spiked payout for competitions, etc. System 100 may use the information in contest creation and generation and payout structure generation.

System 100 is able to offer any number of contests and instances of each contest in accordance with any parameter setting at any time. As is described in more detail below, multiple instances of a contest are possible. Each instance of a given contest can be considered to share a contest "type". While system 100, contest manager 102 and payout structure generator 104 are described herein in connection with short-term contests, such as daily fantasy sports, it should be apparent that they can be used for managing, and generating payout structures for, any contest of any duration.

In accordance with one or more embodiments, system 100 operates in real-time to monitor user, e.g., contest participant, behavior and contest fill rates, and makes determinations such as when to offer new contests and/or contest instances. In accordance with one or more embodiments, contest manager 102 is configured to, among other things, create contest instances, monitor the activity of contest participants in connection with the contest instances, create additional contest instances to replace contest instances filled to capacity during the contest's contest generation period, and determine whether or not to dynamically adjust contest creation parameters, e.g., a parameter, n, identifying a number of instances of a contest to create at the start of a given contest generation period and a maintenance parameter, m, specifying a maintenance level; and payout structure generator 104 is configured, among other things, to automatically generate a prize payout structure for each contest in accordance with the contest's contest type and other considerations. As such, there is very little if any need for manual intervention in the management of fantasy contests offered using system 100.

In accordance with one or more embodiments, contest manager 102 may determine a contest generation period for a given day and sports league. A contest generation period refers to an interval of time between the start of the contests that ran on the preceding day for a contest provider, and the start of the contests being offered for the contest provider on the current day. For example and without limitation, on weeknights, the bulk of MLB games begin, at the earliest, at 7:00 PM Eastern time, and hence a Daily Fantasy contest provider, such as and without limitation Yahoo!™, might have most of its MLB contests start at 7:00 PM Eastern Time. In this situation, the contest generation period refers to the time between the start of the previous day's MLB contests, and 7:00 PM Eastern Time on the current day. If no MLB contests were offered the previous day, then the contest generation period might refer to the time between the start of the MLB contests on the most recent day in which contests were offered, and 7:00 PM Eastern Time of the current day. Other contest generation periods are also contemplated. For example and without limitation, contest management 102 can provide contest creation for a contest provider to offer some additional MLB contests that may start at some designated time after 7:00 PM using statistics from MLB games that started after the contest began.

In accordance with one or more embodiments, a number of contest participants compete against each other and are then ordered, or ranked, based on performance. Using a payout structure determined in accordance with one or more embodiments of the present disclosure, prize money can be distributed to the participants based on their rank in the order, with higher ranks receiving more money than lower ranks.

Embodiments of the present disclosure may be used with any type of contest now known or later developed. Examples of contest types include without limitation double up, 50/50, quadruple up, tournament. With a double up contest, slightly less than 50% of the contest participants double their money and the remaining contest participants win nothing. With a 50/50 contest, 50% of the participants will almost double their money, and the remaining contest participants win nothing. In a quadruple up contest, roughly the top 25% of the participants quadruple their money, and the remaining contest participants win nothing. With a tournament, payouts are determined by apportioning the prize pool among the winning contest participants.

As used herein, a tournament refers to any contest having a payout structure in which the first place winner wins the most amount of money, the second place winner wins an amount that is less than the first place amount, and so on; such a structure satisfies prize amount monotonicity.

In accordance with one or more embodiments, system 100 can receive input from a contest specifier, contest provider and contest participants, or other users of system 100. With respect to a contest provider, system 100 can receive configuration information, which may be submitted as a configuration file, input via a user interface such as might be provided using one or more web pages. The configuration specified by the provider can comprise such information as the types of contests to be offered by the system 100 on the provider's behalf, and, for each contest type, one or more contest creation and/or management parameters. For example and without limitation, a contest provider may provide initial values for the parameter, n, specifying a number of identical contests, which may be referred to herein as contest instances, of the given type to create at the start of a given contest generation period, and the parameter, m, specifying a maintenance level. The parameters can vary from one contest configuration to another, and the parameters may be dynamically altered by contest manager 102.

The parameters may depend on the number of possible participants. By way of some non-limiting examples, m might be set to 0, precluding contest replacement, for a contest having a large capacity, e.g., each contest instance has a large number of participant slots, while m might be set to a number between 2 and 6 for a low-capacity contest, e.g., each contest instance has a small number of participant slots.

In accordance with one or more embodiments, contest manager 102 automatically creates the number, n, instances of the contest type at the start of a contest generation period. System 100 monitors contest instances and determines whether or not a contest instance is closed, e.g., a contest is closed when the number of participants reaches capacity, e.g., the number of participants signed up to participate in a contest instance reaches the allowed number of participants for the contest instance. In addition, contest manager 102 makes a determination whether the number of unfilled contest instances of a contest falls below mi. If contest manager 102 determines that the number of unfilled contest instances falls below the value of m, it can automatically create a number of new contest instances to bring the number of unfilled contest instances to m. In determining whether or not to create the new contest instance(s), contest manager 102 uses the contest generation period, the end of which may be identified based on a specified contest start time parameter, to determine whether or not to create a new contest instance. By way of a non-limiting example, contest manager 102 might forego creating a new contest instance, even in a case that the number of unfilled contest instances is below the maintenance number, m, instances if a start time of the contest is within a given amount of time, which may be specified by a contest provider, for example.

By ensuring that at least the maintenance number of instances of a contest type is offered at any given time, contest manager 102 is able to adjust to user demand, and can do so without user intervention. If demand is substantially higher one week than in the previous week, more contest instances are likely to fill to capacity, but they can be immediately replaced by new contest instances by contest manager 102.

Furthermore, contest manager 102 may be configured to use a larger number for n as the number of contest instances to be created at the start of the contest generation period, so that system 100 gives users, e.g., potential contest participants, a greater number of choices in terms of which instance of a contest to join. By way of some non-limiting examples, some users may prefer to join contests that are currently well below capacity, in the hope that the contest will fail to fill, while others may prefer to choose a contest based on the experience level of users who have already joined, if the contest provider makes user experience statistics publicly available.

In accordance with one or more embodiments, the contest manager 102 may be configured to automatically update the system parameters, n and m, based on demand. For example, if the system determines that contests are not filling at a fast enough rate on Mondays, or are filling too quickly on Thursdays, then the system 100 might adjust the value of n and/or in used on Mondays and the value of n and/or in used on Thursdays accordingly.

In accordance with one or more such embodiments, contest manager 102 makes a determination whether or not to regenerate contest instances using the maintenance parameter, m, as existing contests fill. In some cases, contest manager 102 may choose to stop regenerating, or creating new, contest instances even though the number of contest instances falls below m. For example and without limitation, as a contest's start time approaches, contest manager 102 may stop creating new instances of a contest altogether or may alter its contest regeneration approach. As the start time approaches, contest manager 102 may elect to create one or more new contest instances, each of which has an entry capacity, e.g., the number of entry slots available, determined by the contest manager 102 using observations made by the contest manager 102, such as and without limitation contest participation data collected from one or more previous contest generation periods.

By way of a non-limiting example, suppose a contest with an entry fee of F dollars fills Y minutes before the contest start time. In accordance with one or more embodiments, contest manager 102 uses at least one previous contest generation period to determine a number of users who joined contests with the same entry fee, F, in the last Y minutes before contest start time in the previous contest generation period(s). By way of a non-limiting example, for MLB, the system can use the previous day's MLB data to estimate how many additional participants are likely to enter a contest with entry fee F in the time remaining, Y.

Contest manager 102 can subtract from the estimated number of additional participants the number of currently unfilled openings in contests with entry fee F. The result, U, is an estimate of the number of users likely to enter a new contest instance with entry fee F if it is created. The result, U, represents an estimated need for available entry slots in a time remaining of a contest's contest generation period. If the number of estimated users, U, exceeds the capacity of a contest instance just filled, contest manager 102 can automatically create a new contest instance that has the same number of slots, e.g., has the same capacity, as the filled contest instance that is being replaced by the new contest instance. If not, contest manager 102 can create a new contest instance with a capacity of U.

In accordance with one or more embodiments, payout structure generator 104 determines a structure to be used to divide a contest's prize pool among the winning contest participants. In accordance with at least one such embodiment, payout structure generator 104 generates a payout structure that apportions a prize pool among the winning contest participants such that the exact amount of the prize pool is apportioned to the contest winners and the prize amounts satisfy monotonicity of prizes, which ensures that the first place, or ranked, prize amount is at least as much as the second place prize amount, which is at least as much as the third place prize amount and so on.

In accordance with one or more such embodiments, the prize amounts are rounded to a nice number while ensuring that the total amount of the payout apportioned to the winners is equal to the total prize pool. In accordance with one or more embodiments, payout structure generator 104 is configured to use as input the total prize pool, the number of winners, the first prize amount and the entry fee and generates a prize payout structure.

In accordance with one or more embodiments, payout structure generator 104 selects tentative prize amounts, e.g., using a power law distribution, defines a mathematical optimization problem to generate a payout structure and satisfy problem conditions, or constraints, (monotonicity, roundness of payouts, total budget, number of winners) in generating the payout structure. Of course, it should be apparent that any approach may be used to define tentative prizes, such as and without limitation exponentially or logarithmically declining tentative prize generation approaches.

In accordance with one or more embodiments, payout structure generator 104 uses a set of buckets, each of which has an associated prize amount, assigns one or more of a contest's winning places, e.g., first place, second place, etc., to one of the buckets in the set. In accordance with one or more such embodiments, each winning place assigned to a bucket has the same associated prize amount, which is the prize amount associated with the bucket.

In accordance with one or more embodiments, there is a ranking associated with the buckets in a set indicative of the prize amounts associated with each bucket; and, the number of contest participants assigned to a bucket with the highest associated prize amount is less than the number of contest participants assigned to the bucket with the next highest associated prize amount, and so on. Of course, it should be apparent that embodiments of the present disclosure may generate a payout structure without using buckets. By way of a non-limiting example, buckets may be superfluous for small tournaments with few participants and each winner is paid a distinct prize.

In accordance with one or more embodiments, the payout structure generator 104 uses a nice number criteria for generating a payout structure comprising aesthetically pleasing prize amounts to be displayed with a contest instance. By way of a non-limiting example, a prize amount of $1,000.00 is preferable to $1,012.11 and/or $1,012.00. By way of a further non-limiting example, a prize amount can be rounded up or rounded down to an aesthetically pleasing amount. Such an aesthetically pleasing amount is referred to herein as a nice number. By way of a non-limiting example, with respect to United States currency denominations, a nice number may be an amount that does not include cents to the right of the decimal point. An aesthetically pleasing nice number can be based on expressed and/or observed user nice number preferences.

In accordance with one or more embodiments, payout structure generator 104 generates a payout structure that includes, to the extent possible, aesthetically pleasing prize amounts. The payout structure generated by the payout structure generator 104 may be displayed in connection with a contest instance that is available for selection by a user, e.g., a potential contest participant, and may not reflect the prize amounts that are to be awarded to the contest winners. The actual prize amounts may differ from the generated payout structure. By way of a non-limiting example, in case where two or more participants tie for a rank, the participants might be awarded some split the prize amount associated with the winning place at which they tied, which prize amount is identified by the payout structure generated by the payout structure generator 104.

In accordance with one or more embodiments, the payout structure generator 104 may use any algorithm or procedure to generate a nice number, or an aesthetically pleasing number. The algorithm that is used can be based on user preference, which may comprise monetary denomination preferences, round number preferences. What constitutes a nice number can differ based on the currency being used with the payout structure, aesthetic preferences of users with respect to rounded prize amounts to be used, etc. With respect to U.S. currency, users are likely to prefer an amount, e.g., $1, $5, etc., excluding cents. In addition and with respect to amounts larger than $10, users are likely to prefer an amount that is some multiple of $5, where the multiple may differ depending on the amount being rounded. By way of a non-limiting example, an amount, X, may be considered a nice number if it is a nonnegative integer and $X = A \cdot 10^K$, where K and A are nonnegative integers and $A \leq 1000$. The following provides a non-limiting example of properties that may be used in identifying a nice number, X, for $A$ less than or equal to 1000:

1. if $A \geq 10$, then A is a multiple of 5;
2. if $A \geq 100$, then A is a multiple of 25:
3. if $A \geq 250$, then A is a multiple of 50.

Using the above properties, the follows provides examples of a nice number, X, less than or equal to 1000:
{1, 2, 3, . . . , 10, 15, 20, . . . , 95, 100, 125, 150, . . . , 225, 250, 300, 350, . . . , 950, 1000}.

The following provides examples of a nice number, X, between 1000 and 3000:
{1000, 1250, 1500, 1750, 2000, 2250, 2500, 3000}.

In accordance with one or more embodiments, payout structure generator 104 generates a payout structure in which each non-zero amount is at least a minimum amount, E, where E is at least, and can preferably be more than, the entry fee paid to enter the contest. By way of a non-limiting example, the minimum amount, E, might be 1.5 times the entry fee.

In accordance with one or more embodiments the payout structure generator 104 uses a two-stage approach using buckets and nice numbers in generating a payout structure for a contest. In the first stage, payout structure generator 104 generates a tentative payout structure which may or may not satisfy bucketing and nice numbers criteria. The tentative payout structure may comprise a number, N, tentative prizes. The number, N, may be a preferred number of winning places for a contest set by a contest specifier, for example and without limitation. By way of some non-limiting examples, where the $i^{th}$ prize may be represented as $\pi_i$, e.g., the first place prize may be denoted as $\pi_1$, the second place prize may be denoted as $\pi_2$, and so on. In accordance with one or more embodiments, payout structure generator 104 takes into account prize amount monotonicity in determining the tentative payout structure, such that $\pi_1 \geq \pi_2 \geq \ldots \geq \pi_N$.

In the second stage, the payout structure generator 104 uses the tentative payout structure to generate at least one related payout structure, which takes into account bucketing and nice number considerations. The related payout structure generated by the payout structure generator 104 may be published, e.g., on a web site such as and without limitation a fantasy contest web site, in connection with a contest instance provided to potential and actual contest participants.

In one or more examples provided herein, B represents a contest's total prize pool, or prize pool, N represents the number of winning contest participants that are intended to share in the prize pool, E represents a minimum prize amount, and $P_i$ represents the prize associated with place i determined by the payout structure generator 104. Preferably, B, the first place prize amount, $P_1$, and N may be user-defined parameters, e.g., set by contest specifier and/or provider. The first place prize amount, $P_1$ may vary widely in fantasy sports contests. By way of a non-limiting example, a range of first place prizes amount might be from 0.05 times B to nearly 0.5 times B. By way of a further non-limiting example, a first place prize amount might be 0.15 times B, such that the first place winner is designated to win 15% of the prize pool. It should be apparent that any first place prize amount may be used with embodiments of the present disclosure. Typically, N may be roughly 25% of the total number of contest participants, although this choice may vary as well, such that any value is contemplated for N.

In accordance with one or more embodiments, in the first stage, payout structure generator 104 generates a tentative payout structure in accordance with a power law that uses a constant, a, indicating a rate, e.g., how quickly or slowly, that the payout amounts fall from the first prize amount to the last prize amount. The inventors have determined that power law ensures that the payoffs drop off at a desirable pace from first place to second place to third place and so on. By way of a non-limiting example, a desirable pace may be expressed as a pace that is fast enough that the very top finishers are richly rewarded relative to the rest of the winners, but slow enough that winning contest participants in, for example the tenth percentile, still win an acceptable amount of money. In addition and since wealth in real societies typically satisfies a power law distribution, users should be intuitively comfortable with a payout structure that mirrors that seen in real life.

In accordance with one or more embodiments, payout structure generator 104 assigns each winning place a prize amount of E dollars to satisfy a minimum payout condition. By way of a non-limiting example, the minimum payout, E, is at least equal to the entry fee. The remaining amount of the prize pool, which may be referred herein as the remaining budget may be determined to be total prize pool, B, less N times E, or $B-(N \cdot E)$.

The payout structure generator 104, in accordance with one or more embodiments of the present disclosure, can apportion the remaining budget according to a power law function, such that the amount of the remaining budget given to winning place i is proportional to $1/i^\alpha$, where $\alpha$ is a fixed constant greater than zero, e.g., $\alpha > 0$. For any positive value of $\alpha$, the resulting payouts satisfy a monotonicity condition that ensures that a higher-ranked winning place's prize amount is at least as great as a lower-ranked winning place's prize amount. In accordance with one or more embodiments, payout structure generator 104 selects a value for α that ensures that the payout amounts of a payout structure sum to the amount of the prize pool, B. In accordance with one or more embodiments, the value of α used in $1/i^\alpha$ may be selected in accordance with the following:

$$B - (N \times E) = \sum_{i=1}^{N} \frac{P_1 - E}{i^\alpha}$$

In accordance with one or more embodiments, the above expression may be solved for a with a given level of precision by binary search. By way of some non-limiting examples, the level of precision may be set to any level, such as and without a 0.1, 0.001, etc. precision level. A tentative payout, $\pi_i$, for place i may be expressed as:

$$\pi_i := E + \frac{P_i - E}{i^\alpha},$$

Using the above expression for winning places 2 to N, the first place gets exactly $P_1$ and that the sum of all of the tentative payouts in a tentative payout structure equals B. In accordance with one or more embodiments, a power law function is used to distribute a prize pool amount excluding a first place prize amount to each winning place other than first place. In other words, first place may be assigned a predetermined first place prize amount and the remaining prize pool, e.g., a total prize pool less the first place prize amount, can be distributed to winning places other than first place using the power law function.

The tentative payout structure generated by the payout structure generator 104 in the first stage can be expressed as $\pi_1, \ldots, \pi_N$, where a tentative payout, $\pi_i$, represents a tentative payment for the $i^{th}$ place winner.

In a second stage, the payout structure generator 104 uses the tentative payout structure in selecting a related payout structure satisfying bucketing and nice number conditions. In accordance with one or more embodiments, the payout structure generator 104 can generate a number of related payout structure candidates, measure a closeness of each candidate to the tentative payout structure, and select the candidate that is closest, relative to the other candidates, to the tentative payout structure.

By way of a non-limiting example, closeness may comprise a Euclidean distance, e.g., a sum-of-squared error, where the distance between two payout structures $(P_1, \ldots P_N)$ and $(Q_1, \ldots, Q_N)$ may be expressed as $\Sigma_i(P_i-Q_i)^2$. Using this approach, the payout structure generator 104 can identify the related payout structure candidate that is closest to a tentative payout structure determined in the first stage while taking into account bucketing and nice number conditions. In accordance with one or more embodiments, payout structure generator 104 identifies the related payout structure by using optimization, which can be performed using various methods. In a formalized expression of one optimization technique that may be used by payout structure generator 104 in accordance with one or more embodiments, given a target number of buckets, r, the set, $\{1, \ldots, N\}$, of winning places is partitioned into the set of r buckets, which set is represented as $S_1, \ldots, S_r$, each bucket containing a set of consecutive winning places; and, each payout, $\Pi_i$ in a set of payouts, $\Pi_1, \ldots, \Pi_r$ is assigned to a respective bucket, such that $(S_1, \ldots, S_r, \Pi_1, \ldots, \Pi_r)$ is an optimal, or optimized, solution.

In accordance with one or more embodiments, an optimized solution might assign a nice number that is between E and B to each payout, $\Pi_i$ in the set $\Pi_1, \ldots, \Pi_r$, since using any higher payout may result in a total payout exceeding the prize pool. In practice, the range can be set such that numbers much above $P_1$, which is the contest provider's specified amount to be awarded to the first place winner, can be avoided. In accordance with one or more embodiments, any definition may be used to identify nice numbers spread out exponentially as they increase, with an effect that the number of nice numbers below a fixed value, x, is proportional to $\log(x)$, such that there may be $O(\log B)$ nice numbers between E and B.

In accordance with one or more embodiments, a heuristic algorithm is used to find an optimized solution, which solution yields the related payout structure closest to the tentative payout structure and satisfies the bucketing and nice numbers conditions.

Figure 2:
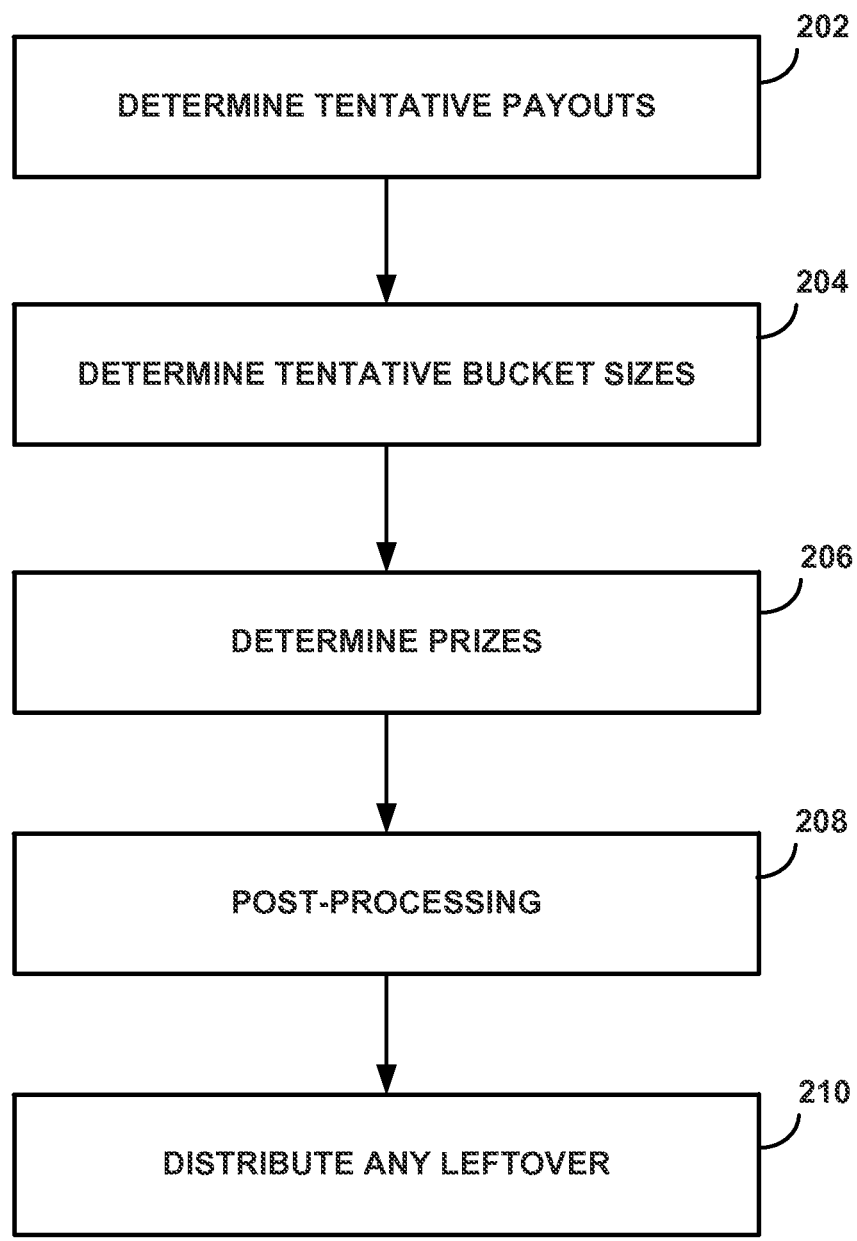

FIG. 2 provides an example of a process flow for a heuristic algorithm used in accordance with one or more embodiments. In the example shown in FIG. 2 and with respect to the first and second stages of operation of payout structure generator 104 discussed herein, step 202 may correspond to the first stage of operation and steps 204, 206, 208 and 210 may correspond to the second stage.

At step 202, a tentative payout structure, e.g., $\pi_1, \ldots, \pi_N$, is determined. At step 204, bucket sizes are initialized. Each bucket's size identifies the number of winning places included in the bucket. In accordance with one or more such embodiments, bucket sizes can be chosen to achieve a bucket size monotonicity, with bucket size decreasing monotonically, such that the size of the first bucket, $S_1$, which corresponds to the winner of the contest, is less than or equal to the size of the second bucket, $S_2$, which has a smaller size than the next bucket and so on. This can be expressed as $|S_1| \le |S_2| < \ldots < |S_r|$.

In accordance with one or more embodiments, a first number of the buckets, e.g., the first four buckets, can be set to a size, e.g., a size of 1, and a determination is can be made whether or not the number of winning places, N, less the sum of the sizes of the first four buckets equals 1. The determination may be expressed as $N-\Sigma_{i=1}^{4}S_i=1$. In other words, it is determined whether the number of winners not assigned to the first four buckets is equal to 1. If so, the size of the next bucket thereafter, in this case the fifth bucket, is set to 1 and processing ends.

If not, the payout structure generator 104 continues processing to set a bucket size, $|S_t|$ for a next bucket, $S_t$, to be equal to the bucket size, $|S_{t-1}|$, of the previous bucket, $S_{t-1}$, times a factor, β, which can be expressed as $|S_t|=\lceil|S_{t-1}|\rceil$, where $\beta \ge 1$ and the "⌈ ⌉" brackets represent a ceiling function which may be used to map the result determined within the brackets to the largest integer not less than the result, e.g., the result can be rounded up to the nearest integer value if the result is a non-integer value.

In accordance with one or more embodiments, when processing a $t^{th}$ bucket, a determination may be made whether or not to continue the process of determining the number of buckets and the size of each bucket. Such a determination may use N and the size of the buckets up to and including the $t^{th}$ bucket. By way of a non-limiting example, the process may terminate if the payout structure generator 104 determines the following two conditions to be true:

$\lceil \beta^2 |S_t| \rceil + \lceil \beta |S_t| \rceil + \Sigma_{i=1}^{t} |S_i| > N$, and $\lceil \beta |S_t| \rceil + \Sigma_{i=1}^{t} |S_i| \leq N$.

In accordance with one or more embodiments, one or more determinations may be made in determining whether or not to accept a current set of initial bucket sizes at step 204. By way of some non-limiting examples, such determinations may comprise the following:

$4|S_t| + 2|S_t| + \Sigma_{i=1}^{t} |S_i| > N$, and $2|S_t| + \Sigma_{i=1}^{t} |S_i| \leq N$, In accordance with one or more embodiments, the size of the $S_{t+1}$ bucket, which size is represented as $|S_{t+1}|$, and the size, $|S_{t+2}|$, of bucket $S_{t+2}$ can be expressed as:

$$|S_{t+1}| = \left\lfloor \frac{\left|N - \sum_{i=1}^{t} |S_i|\right|}{2} \right\rfloor, |S_{t+2}| = \left\lceil \frac{\left|N - \sum_{i=1}^{t} |S_i|\right|}{2} \right\rceil,$$

where the "$\lfloor \ \rfloor$" brackets represent a floor function which may be used to map the result determined within the brackets to the largest nice number not greater than the result, e.g., the result can be rounded down to the nearest integer value if the result is a non-integer value.

The factor, $\beta$, may be any value, which may be determined heuristically and/or may be different for different contests, e.g., a value used for a small contest, e.g., a contest with a small number of participants, may be different than the value used for a large contest, e.g., a contest with a large number of participants.

By way of a non-limiting example, $\beta$, may be initially set to 1, and a number of buckets can be determined using the initial value. If the number of buckets is larger than the desired number of buckets, r, the value of $\beta$ may be increased and the new value of $\beta$ may be used to determine a new number of buckets generated using the new value. For example and without limitation, such an iterative process may indicate that a value of 1.4 for $\beta$ yields a reasonable number of buckets and satisfies the bucket number specified by r.

Processing continues at step 206 to determine each bucket's associated prize amount, or payout. In the case of the first bucket, its associated prize amount may be determined using the first tentative prize, $\pi_1$, rounded, e.g., rounded down, to the nearest nice number. The difference between the first tentative prize, $\pi_1$, and the nearest nice number selected as the first bucket's associated prize amount is a leftover, L, for the first bucket.

A nearest nice number is selected for each of the remaining buckets, $S_2, \ldots, S_1$. An iterative process can be used, such that for a given bucket, $S_i$, of the remaining buckets, an average prize amount can be determined for the bucket using an aggregate, $R_i$, of the tentative prizes assigned to the bucket and the leftover from the previous bucket(s) divided by the size, $n_i$, of the bucket, e.g., $R_i/n_i$ where $n_i=|S_i|$, rounded, e.g., rounded down, to the nearest nice number. In other words, a prize amount, $\Pi_i$, for a given bucket, $S_i$, of the remaining buckets can be determined using $R_i/|S_i|$, with the result rounded down to the nearest nice number.

A determination can be made whether the prize amount, $\Pi_i$, for a given bucket, $S_i$, is greater than or equal to the prize amount, $\Pi_{i-1}$, for the previous bucket, $S_{i-1}$. If so, buckets $S_i$ and $S_{i-1}$ can be merged, so that the members, or winning places, assigned to the two buckets are assigned to one bucket with a prize amount $\Pi_{i-1}$ equal to $\Pi_i$ being assigned to merged bucket.

A bucket merger performed at step 206 may result in a situation in which the size of a bucket, $S_i$ is greater than the size of bucket, $S_{i+1}$. Step 208 may be used to preserve monotonic bucket sizes, e.g., $|S_1| \leq |S_2| \leq \ldots \leq |S_r|$. Step 208 may be performed to adjust buckets sizes to ensure increasing bucket size when moving from a higher prize to a smaller prize. At step 208, a determination is made whether or not the size of bucket, $S_i$, for i=1 to r–1 is larger than the size of bucket, $S_{i+1}$. If it is, winning places can be shifted to bucket, $S_{i+1}$ until the size of bucket, $S_{i+1}$ is at least equal to the size of bucket, $S_i$.

Figure 3:
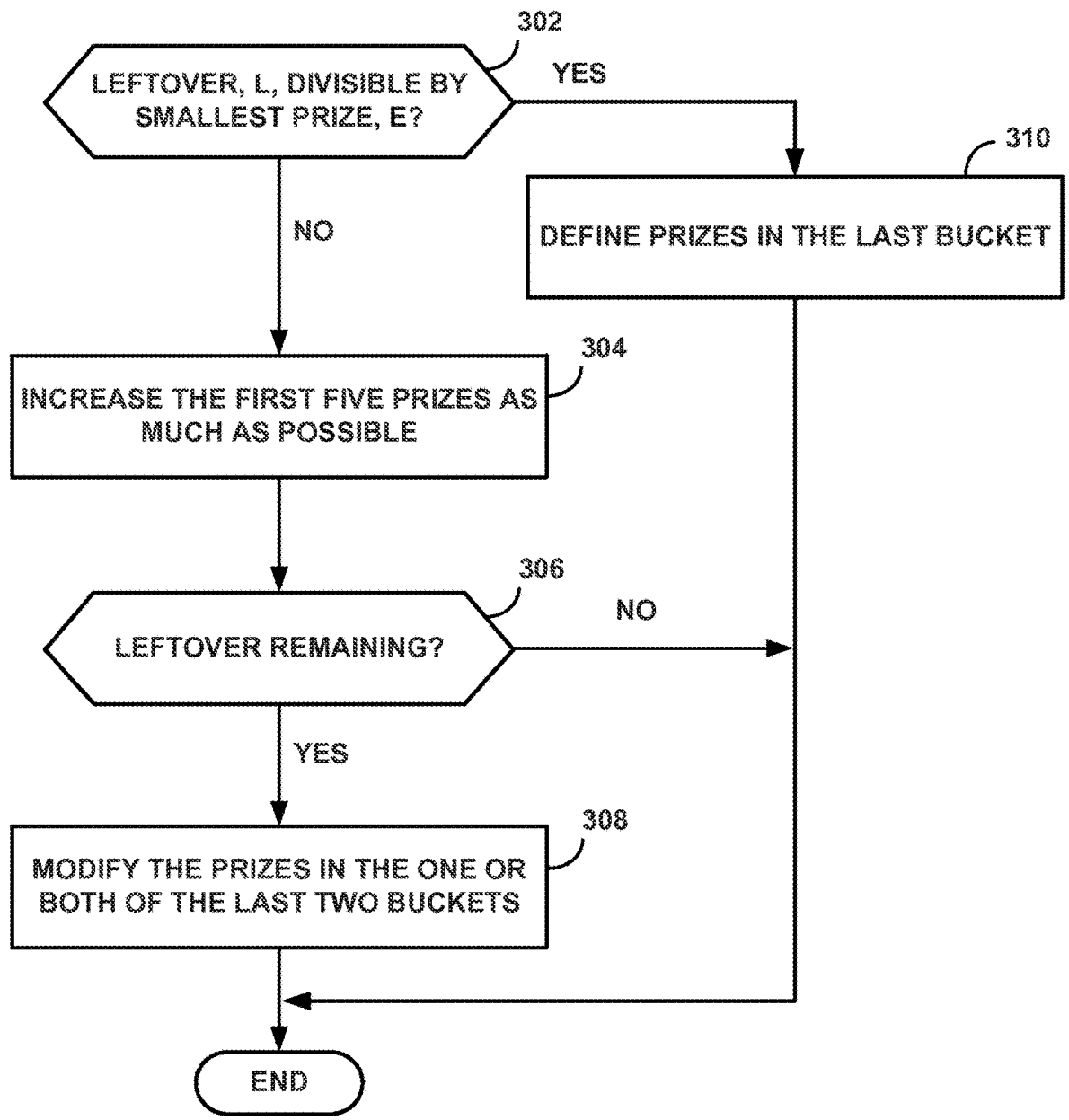

It is possible that step 206 results in a non-zero leftover remaining from the last bucket. In other words, it is possible that there is a leftover, L, amount associated with the last bucket processed at 206. The leftover may be distributed, at step 210 by modifying the payout of one or more of the buckets. FIG. 3 provides an example of a leftover distribution process flow for use in accordance with one or more embodiments.

At step 302 of FIG. 3, a determination is made whether the leftover, L, is divisible by the smallest prize amount, e.g., $\Pi_k$ associated with the last bucket, $S_k$. If L is determined to be divisible by $\Pi_k$, the size, $|S_k|$, of bucket $S_k$, can be increased by $\Pi_k/L$, thereby increasing the number of users winning nonzero prizes beyond N. Processing may end, since the leftover amount is distributed.

If it is determined, at step 302, that L is indivisible by $\Pi_k$, processing continues at step 304 to distribute the leftover amount, as much as possible, to some or all of the beginning buckets. While the prize amount associated with the first bucket might be modified in some cases, it may be that the first place prize amount is set by the contest specifier and/or provider, e.g., the first place prize amount is set to $1 million dollars, and cannot be changed. Consequently and in one illustrative approach, the leftover may be distributed with one or more buckets after the first place bucket. By way of a none-limiting example, the leftover might be distributed to one or more of the buckets after the first bucket that have one winning place associated with the bucket. In accordance with one or more embodiments, the second, third, fourth, and possibly fifth, buckets may have been assigned one winning place each, and at least some of the leftover, L, may be distributed to one or more of these buckets, e.g., to some or all of buckets $S_2, \ldots, S_5$.

To further illustrate without limitation, for i=2 to 5, the payout amount, $\Pi_i$, associated with bucket, $S_i$, can be adjusted to equal $\min\{\Pi_i+L, (\Pi_{i-1}+\Pi_i)/2\}$, rounded down to a nice number. In so doing, as much of L as possible can be distributed without resulting in too large an increase in each prize.

At step 308, a determination is made whether there is any leftover, L, remaining after the distribution performed at step 304. If there is no leftover remaining after step 304, processing ends.

If it is determined, at step 306, that there is some leftover, L, remaining after the distribution at step 304, processing continues at step 308 to perform a second distribution. In the second distribution performed at step 308, an increase to a bucket's prize amount may result in a prize amount associated with bucket that is not a nice number; however, such a case might be limited to the last bucket, $S_k$.

In accordance with one or more embodiments, the remaining leftover can be distributed using the last bucket, $S_k$, or the last two buckets, $S_k$ and $S_{k-1}$. The last bucket, $S_k$, in the set of buckets, is typically the largest bucket when using monotonically increasing bucket sizes.

In the second distribution, a determination can be made whether the bucket size of bucket, $S_k$, is greater than or equal to the leftover, L, remaining after step 304, e.g., $L \geq |S_k|$. If so, the prize amount associated with bucket, $S_k$, can be incremented by one, e.g., $\Pi_k = \Pi_k + 1$, and L is decreased by the bucket's size, e.g., $L = L - |S_k|$. In effect and in a case that U.S. currency is used for the payout structure, the prize amount for each winner in bucket $S_k$ can be increased by one dollar. The adjustment may be repeated, e.g., incrementing the prize amount associated with bucket $S_k$, by one dollar until $L < |S_k|$, and a determination may be made whether L is divisible by $\Pi_k$.

Alternatively, the amount of L remaining after step 304 may be distributed to the last two buckets, e.g., $S_{k-1}$ and $S_k$. By way of a non-limiting example, an amount of money available is determined by summing all of the prizes in these buckets plus L. By way of a non-limiting example, the prize amount associated with a bucket multiplied by the number of winning places associated with the bucket yields the bucket's prizes. The prize amount associated with the last bucket can be set to be a minimal possible amount, E.

Various alternatives for distributing L can be considered, each of which includes a possible size and integer prize amount for the penultimate bucket, $S_{k-1}$. Nice number considerations may be ignored. The last bucket can be made to have an integer size with a payout E. For each alternative, a potential or candidate solution, a "heuristic cost" may be determined to penalize for various violations of considerations, or constraints, used in determining an optimized solution. By way of some non-limiting examples, a candidate's heuristic cost can reflect that the number of winners determined for the candidate is less than or greater than N, bucket size monotonicity is not upheld with the candidate, etc. By way of some further non-limiting examples, a candidate's heuristic cost may include a charge, e.g., a charge of 100, for each unit of difference if the potential solution's number of winners is less than N, the candidate's heuristic cost may include a charge, e.g., a charge of 1, for each unit of difference between the candidate's number of winners and N if the candidate's number of winners is larger than N, and the heuristic cost may include a charge, e.g., a charge of 10, for each unit of violation in bucket size monotonicity.

Each candidate's heuristic cost can be used to select one of the candidates. By way of a non-limiting example, the candidate that is selected is the one with the minimal heuristic cost relative to the heuristic cost(s) of the other candidates considered. In other words, a prize and size solution may be selected for the penultimate bucket that violates the various considerations, or problem solution constraints, the least.

FIG. 4 provides an example of a payout structure determined in accordance with embodiments of the present disclosure. In the example provided in FIG. 4, the prize pool, B, is equal to $3000, the first prize, $P_1$, is equal to $300, the number of winners, N, is equal to 853, and the smallest prize amount, E, is equal to $2. The payout structure generator 102 operating in accordance with one or more embodiments of the present disclosure determines the number of buckets to be 13, where buckets 1-5 each has one winning place assigned to the bucket, buckets 6 and 7 each have two winning places assigned to the bucket, and so on. The bucket sizes satisfy bucket size monotonicity such that the bucket size increase monotonically from the first bucket to the last. The prize amounts associated with each bucket satisfy prize amount monotonicity such that the prize amounts decrease monotonically from the first bucket to the last. Each bucket's prize amount is a nice number, which satisfies aesthetic prize amount preferences, which may be specified by and/or determined for the user. The nice number used for a prize amount can be generated using a nice number generator such as that discussed hereinabove. The aggregate bucket size of 853 is equal to N, the total prize pool is equal to B, the prize amount associated with the first bucket corresponds to the first place prize, $P_1$, and the last bucket has a prize amount corresponding to the smallest prize amount, E.

In accordance with one or more embodiments, for a given contest instance created by contest manager 102, contest manager 102 may identify the winning participants as well as an ordering, or ranking, of the winning participants, e.g., from 1 to 853, and use the pay structure 404 generated by payout structure generator 104 using parameters 402 as a guide for assigning a prize amount to each of the 853 winners. According to the pay structure 404, the first place winner is to receive $300, the second place winner is to receive $200, etc., with the last 649 winners to receive $2 each.

FIG. 5 provides an illustrative summarization of a payout structure optimization using a heuristic approach in accordance with one or more embodiments of the present disclosure. As stated in the example provided in FIG. 5, the payout structure optimization problem can be optimized to find a set of buckets and corresponding prize amounts given a set of ideal payouts for N contest winners, a total prize pool and a minimum payout amount. In the example shown in FIG. 5, expression 502 can be optimized to determine an optimal solution comprising a set of buckets and corresponding prize amounts, e.g., $(S_1, \ldots, S_r, \Pi_1, \ldots, \Pi_r)$. An optimal solution found by optimizing expression 502 yields a related payout structure closest to an initial payout structure subject to any conditions, e.g., conditions 504.

As discussed herein, a heuristic approach may be used in identifying optimized solution to the payout structure generation problem. It should be apparent that other approaches in addition to a heuristic approach may find an optimized solution. By way of a non-limiting example, and integer linear approach may be used.

FIG. 6 provides an illustrative summarization of a payout structure optimization using an integer programming approach in accordance with one or more embodiments of the present disclosure. In the example shown in FIG. 6, expression 602 can be optimized to determine an optimal solution that assigns a winning place of N winning places to a bucket of a set of buckets and a prize amount to each bucket in the bucket set. An optimal solution found by optimizing expression 602 yields a related payout structure closest to an initial payout structure subject to any conditions, e.g., conditions 604.

By way of a non-limiting example, assume a set of prize payouts, $\{p_1 > p_2 > \ldots > p_m\}$, where m is typically greater than r, the number of buckets. The payouts may be generated, for example, using nice numbers. In accordance with one or more embodiments, the highest prize amount can be set to $P_1$, e.g., $p_1 = P_1$, where is the pre-specified winning prize. Additionally and in order to enforce the minimum payout consideration, the pre-specified minimum payout, E, can be used for $p_m$, e.g., $p_m = E$. In accordance with one or more embodiments, an integer program used to in the integer approach can use variables $x_{i,j,k}$ and $\tilde{x}_{j,k}$.

By way of a non-limiting example, the variable $x_{i,j,k}$, is a binary contest participant, or contestant, variable, e.g., the variable has a value of 0 or 1. The number of contest variables can be determined based on the specified number of contest winners, N, the number of buckets, r, and the number of prize amounts, m, e.g., N×r×d. For each variable, $\tilde{x}_{i,j,k}$, i is an index into an ordering, or ranking, of the winning places, e.g., 1 to N, j is a bucket index, e.g., 1 to j, and k is a prize amount index, e.g., 1 to d. The variable, $x_{i,j,k}$, receives a value of 1, e.g., $x_{i,j,k}=1$, if the winning place, $x_i$, is assigned to bucket $S_k$ and is to receive payout $p_k$.

By way of a further non-limiting example, the variable $\tilde{x}_{j,k}$ may be used as binary auxiliary variable, e.g., the variable has a value of 0 or 1. The number of auxiliary variables can be determined based on the number of buckets, r, and the number of prize amounts, d, e.g., r×d. For each variable, $\tilde{x}_{j,k}$, j is a bucket index, e.g., 1 to r, and k is a prize amount index, e.g., 1 to d. The variable, $\tilde{x}_{j,k}$ receives a value of 1, e.g., $x_{i,j,k}=1$, if bucket $S_j$ is assigned payout $p_k$. Conditions 604 of FIG. 6 ensure that $x_{i,j,k}$ is set to 1 when $\tilde{x}_{j,k}$ has a value of 1. If, for a given j, $\tilde{x}_{j,k}=0$ for all k, $S_j$ is not assigned a payout, indicating that the bucket is not to be used in the payout structure solution determined by the payout structure generator 104.

In accordance with one or more embodiments, the payout structure generator 104 may select a payout structure generation technique based on the number of winners. To illustrate without limitation in any way, the payout structure generator 104 may use a heuristic approach or a linear programming approach, for a contest with a large number of winners and may use another approach for a contest with a small number of winners.

By way of a non-limiting example, where the number of winners is small, e.g., N=2, N=3, etc., the payout structure generator 104 may use parameters B, N, E and X to determine a payout structure. The parameters B, N, E are the same parameters discussed in connection with other payout structure generation techniques discussed herein. The parameter X represents a target percentage used to determine a tentative prize amount for the first place winner, e.g., X represents a target percentage of the prize pool that can be used in determining the first place prize amount. To further illustrate without limitation, the target percentage, X, of the prize pool to be awarded to the participant ranked first might be set at 60%, e.g., X=60%. It should be apparent that any value of X may be used.

Using 60% as the target percentage, X, if N=2, a tentative first prize, $\pi_1$, may be equal to the total prize pool amount, B, times the target percentage, X, e.g., $\pi_1=X\cdot B$ or $\pi_1=0.6\cdot B$, where X=0.6. The resulting value for $\pi_1$ can be rounded down to the nearest nice number. If rounding $\pi_1$ down to the nearest nice number results in a first place prize amount that is less than half of the total prize pool, e.g., $0.5\cdot B$, $\pi_1$ can be rounded up to the nearest nice number. Otherwise, the first place prize amount, $P_1$, may be determined by rounding $\pi_1$ to the closest nice number. For the second place prize amount, if $B-P_1<E$, $P_1$ can be redefined to be $0.6\cdot B$ rounded to the nearest integer, and the second place prize, $P_2$ can be the difference between B and the first place prize amount, e.g., $P_2=B-P_1$.

By way of a further non-limiting example, if there are 3 contest winners, e.g., N=3, a tentative first place prize amount, $\pi_1$, may be determined as follows: $\pi_1=X\cdot(B-E)$ or $\pi_1=0.6\cdot(B-E)$, where X=0.6. Rounding similar to the discussed above in connection with N=2 may be used. If rounding $\pi_1$ down to the nearest nice number results in a prize amount that is less than half of the total prize pool, e.g., $0.5\cdot B$, $\pi_1$ can be rounded up to the nearest nice number. Otherwise, the first place prize amount, $P_1$, may be determined by rounding $\pi_1$ to the closest nice number. If $B-P_1<2\cdot E$, $P_1$ can be redefined to be $0.6\cdot(B-E)$ rounded to the nearest integer. The tentative second place prize amount can be determined to be $\pi_2=B-P_1-E$, and $\Lambda$ can be the tentative second place prize amount, rounded down to the nearest nice number. If $\Lambda<E+(\pi_2-\Lambda)$, the second place prize amount can be set to the tentative second place prize amount, e.g., $P_2=\pi_2$, and the third place prize amount can be set to E. e.g., $P_3=E$. Otherwise, the second place prize amount, $P_2$, can be set to $\Lambda$, and the third place prize amount, $P_3$, can be determined to be $P_3=B-P_1-P_2$.

FIG. 7 provides a sample graphical user interface (GUI) screen in accordance with one or more embodiments of the present disclosure. The GUI screen examples shown in FIGS. 7 and 8 may be provided by one or more server computers via an electronic communications network, such as and without limitation the internet, and generated by a web browser a number of user computing devices, for example.

The example shown in FIG. 7 provides a listing of MLB contests with guaranteed payouts. Each line below the title line corresponds to an instance of a contest generated by contest manager 102. Fields 702, 704, 706, 708 and 710 display information for each contest instance including a contest description in field 702, number of current participants and maximum number of possible participants in field 704, an entry fee amount in field 706, a prize pool amount, e.g., a total amount of the prizes to be awarded, in field 708 and a contest start time in field 710. The contest start time may be used to by the contest manager 102 to determine a contest generation period.

Each contest instance entry may also include none or more of icons 714 and 716. The presence of icon 714 in connection with a contest instance indicates that a user can enter the contest instance more than once. The presence of icon 716 in connection with a contest instance indicates that the contest instance is guaranteed to run even if it does not fill to capacity. Each contest instance has an associated button 712, which is selectable by a user to enter the corresponding contest instance.

Figure 8:
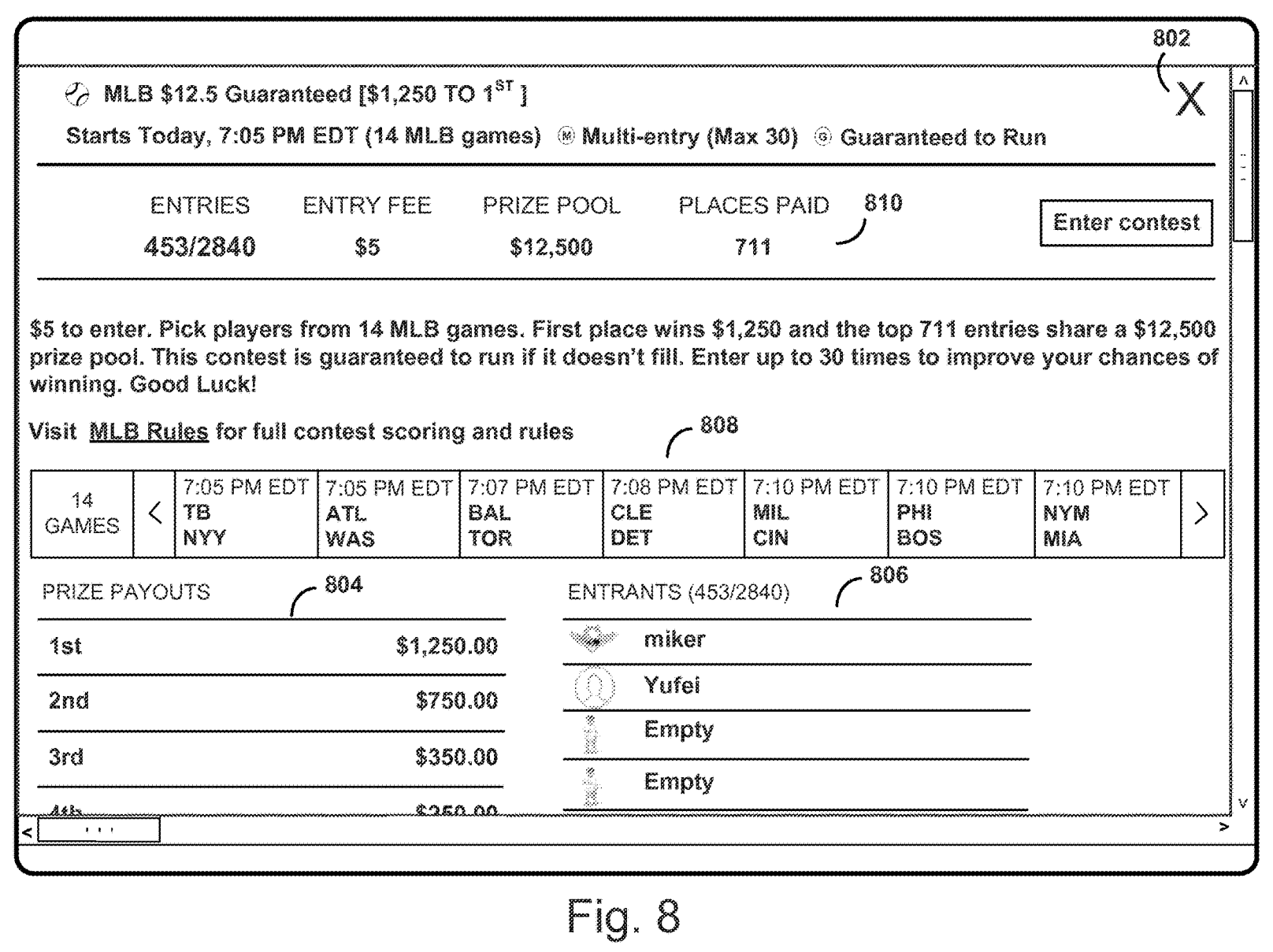

FIG. 8 provides an example of another graphical user interface (GUI) screen in accordance with one or more embodiments of the present disclosure. The GUI screen example of FIG. 8 can be displayed in response to a user's selection of a contest instance from the GUI screen example of FIG. 7. The user may exit the screen, e.g., to navigate back to the GUI screen shown in FIG. 7, by selecting icon 802.

The GUI screen example shown in FIG. 8 includes a payout structure display portion 804, which provides at least a portion of a payout structure generated by the payout structure generator 104. If the entire payout structure is not fully displayed in area 804, the user may use a scrolling capability to view the payout structure, for example. The GUI screen example includes an area 810 to display the number of winning places, which value can be determined by the payout structure generator 104.

Area 806 of the GUI screen example includes a listing of entrants, or contest participants. In the example shown in FIG. 8, the contest is a MLB contest. Area 808 includes a listing of the MLB games whose players are available to be selected by a participant. The user is able to scroll through the MLB game listing.

Figure 9:
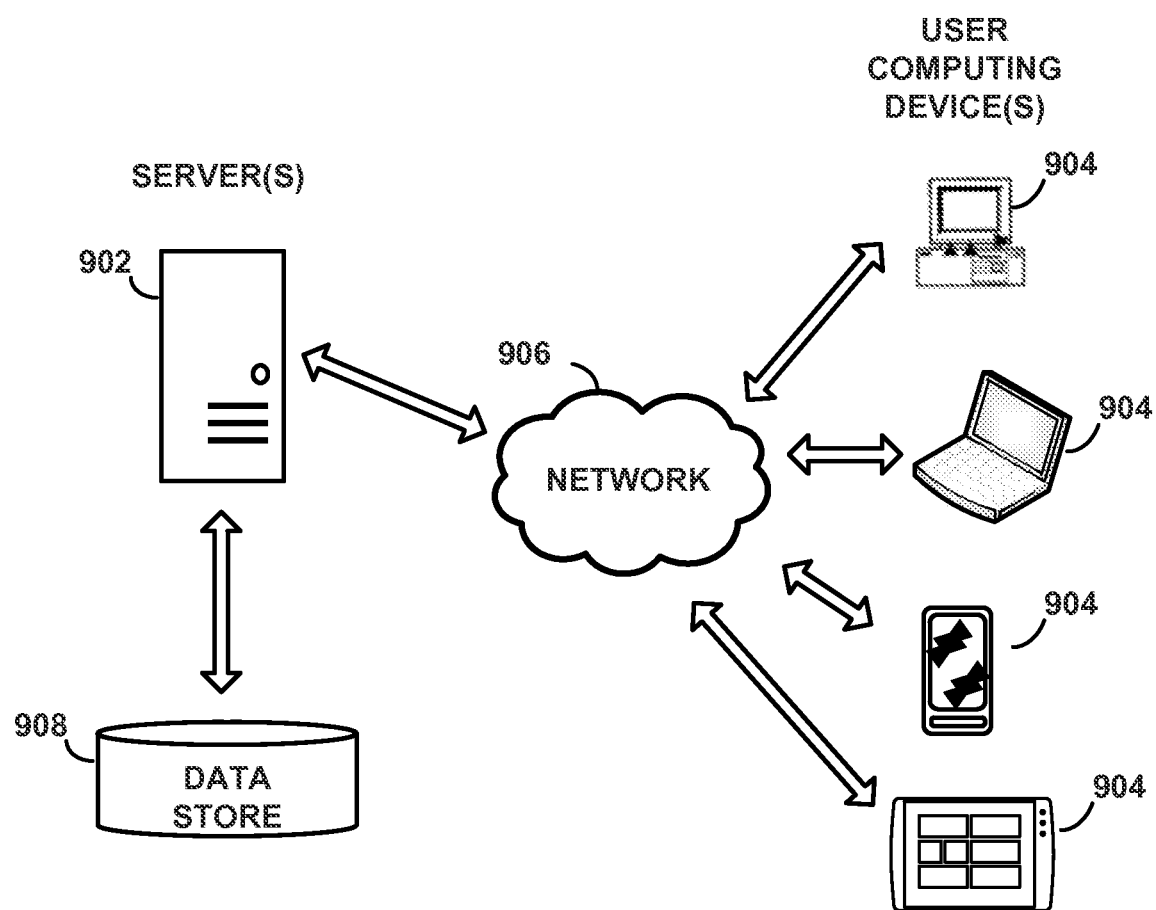
FIG. 9 illustrates some components that can be used in connection with one or more embodiments of the present disclosure.

FIG. 9 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 902 can be configured to execute program code, instructions, etc. to provide functionality in accordance with one or more embodiments of the present disclosure. The same or another computing device 902 may be configured to execute program code to implement functionality in accordance with one or more embodiments of the present disclosure.

Computing device 902 can serve content to user computing devices 904 via a network 906 for display at the computing devices 904 using a browser application, for example. User computing devices 904 can include without limitation devices 108, 110 and/or 112. Data store 908, which can include data store 106, can be used to store program code to configure a server 902 to functionality in accordance with one or more embodiments of the present disclosure.

The user computing device 904 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition can be specified using any of a number of languages, including without limitation a markup language such as Hypertext Markup Language, scripts, applets and the like. The user interface definition can be processed by an application executing on the user computing device 904, such as a browser application, to output the user interface on a display coupled, e.g., a display directly or indirectly connected, to the user computing device 904.

In an embodiment the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 9. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 10 is a detailed block diagram illustrating an internal architecture of a computing device, e.g., a computing device such as server 902 or user computing device 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1020 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   creating, by a computing device, an initial number of instances of a contest at a beginning of a contest generation period associated with the contest, each contest instance having a same number of available entry slots for possible contest participants to enter the contest prior to the contest's start time;

monitoring, by the computing device, a number of available contest instances to ensure that there are at least a maintenance number of available contest instances for possible contest participants to enter the contest prior to the contest's start time;

creating, by the computing device and for a first portion of the contest generation period, an additional instance of the contest to replace a filled contest instance such that there are a maintenance number of available contest instances, the additional contest instance having the same number of entry slots as the filled contest instance; and for a second portion of the contest generation period before the contest's start time:
estimating, by the computing device, a number of possible contest participants likely to enter the contest during the second portion of the contest generation period; and
creating, by the computing device, an additional instance of the contest to replace the filled contest instance based on an estimated number of possible contest participants likely to enter the contest during the second portion of the contest generation period.

2. The method of claim 1, further comprising:
collecting, by the computing device, data about contest entry by contest participants in connection with at least one previous contest generation period; and
using, by the computing device, the data in estimating the number of possible contest participants likely to enter the contest during the second portion of the contest generation period.

3. The method of claim 2, the data comprising data for a previous contest from the at least one previous contest generation period that has a same entry fee as the contest.

4. The method of claim 2, the data comprising data from the second portion of the at least one previous contest generation period.

5. The method of claim 2, further comprising
determining, by the computing device, an aggregate number of unfilled entry slots using the number of unfilled entry slots in each available contest instance;
reducing, by the computing device, the estimated number of possible contest participants by the determined aggregate number of unfilled entry slots to yield an estimated need for entry slots;
creating, by the computing device, the additional contest instance in the second portion of the contest generation period to replace the filled contest instance, the additional contest instance having the same number of entry slots as the filled contest instance if the estimated need for entry slots exceeds the filled contest instance's number of entry slots; and
creating, by the computing device, the additional contest instance in the second portion of the contest generation period to replace the filled contest instance, the additional contest instance having a number of entry slots equal to the estimated need for entry slots if the estimated need for entry slots does not exceed the filled contest instance's number of entry slots.

6. The method of claim 1, further comprising:
collecting, by the computing device, data about contest entry by contest participants in connection with at least one previous contest generation period;
determining, by the computing device, whether or not to modify the initial number of instances of the contest using the collected data; and
determining, by the computing device, whether or not to modify the maintenance number of instances of the contest using the collected data.

7. A system comprising:
at least one computing device, each computing device comprising a processor and a storage medium for tangibly storing thereon program logic for execution by the processor, the stored program logic comprising:
creating logic executed by the processor for creating an initial number of instances of a contest at a beginning of a contest generation period associated with the contest, each contest instance having a same number of available entry slots for possible contest participants to enter the contest prior to the contest's start time;
monitoring logic executed by the processor for monitoring a number of available contest instances to ensure that there are at least a maintenance number of available contest instances for possible contest participants to enter the contest prior to the contest's start time;
creating logic executed by the processor for creating, for a first portion of the contest generation period, an additional instance of the contest to replace a filled contest instance such that there are a maintenance number of available contest instances, the additional contest instance having the same number of entry slots as the filled contest instance; and
for a second portion of the contest generation period before the contest's start time:
estimating logic executed by the processor for estimating a number of possible contest participants likely to enter the contest during the second portion of the contest generation period; and
creating logic executed by the processor for creating an additional instance of the contest to replace the filled contest instance based on an estimated number of possible contest participants likely to enter the contest during the second portion of the contest generation period.

8. The system of claim 7, the stored program logic further comprising:
collecting logic executed by the processor for collecting data about contest entry by contest participants in connection with at least one previous contest generation period; and
using logic executed by the processor for using the data in estimating the number of possible contest participants likely to enter the contest during the second portion of the contest generation period.

9. The system of claim 8, the data comprising data for a previous contest from the at least one previous contest generation period that has a same entry fee as the contest.

10. The system of claim 8, the data comprising data from the second portion of the at least one previous contest generation period.

11. The system of claim 8, the stored program logic further comprising
determining logic executed by the processor for determining an aggregate number of unfilled entry slots using the number of unfilled entry slots in each available contest instance;
reducing logic executed by the processor for reducing the estimated number of possible contest participants by the determined aggregate number of unfilled entry slots to yield an estimated need for entry slots;

creating logic executed by the processor for creating the additional contest instance in the second portion of the contest generation period to replace the filled contest instance, the additional contest instance having the same number of entry slots as the filled contest instance if the estimated need for entry slots exceeds the filled contest instance's number of entry slots; and creating logic executed by the processor for creating the additional contest instance in the second portion of the contest generation period to replace the filled contest instance, the additional contest instance having a number of entry slots equal to the estimated need for entry slots if the estimated need for entry slots does not exceed the filled contest instance's number of entry slots.

12. The system of claim 7, the stored program logic further comprising:

collecting logic executed by the processor for collecting data about contest entry by contest participants in connection with at least one previous contest generation period;

determining logic executed by the processor for determining whether or not to modify the initial number of instances of the contest using the collected data; and determining logic executed by the processor for determining whether or not to modify the maintenance number of instances of the contest using the collected data.

13. A computer readable non-transitory storage medium for tangibly storing thereon computer readable instructions that when executed cause a processor to:

create an initial number of instances of a contest at a beginning of a contest generation period associated with the contest, each contest instance having a same number of available entry slots for possible contest participants to enter the contest prior to the contest's start time;

monitor a number of available contest instances to ensure that there are at least a maintenance number of available contest instances for possible contest participants to enter the contest prior to the contest's start time;

create, for a first portion of the contest generation period, an additional instance of the contest to replace a filled contest instance such that there are a maintenance number of available contest instances, the additional contest instance having the same number of entry slots as the filled contest instance; and for a second portion of the contest generation period before the contest's start time:

estimate a number of possible contest participants likely to enter the contest during the second portion of the contest generation period; and create an additional instance of the contest to replace the filled contest instance based on an estimated number of possible contest participants likely to enter the contest during the second portion of the contest generation period.

14. The computer readable non-transitory storage medium of claim 13, the computer readable instructions that when executed further cause the processor to:

collect data about contest entry by contest participants in connection with at least one previous contest generation period; and use the data in estimating the number of possible contest participants likely to enter the contest during the second portion of the contest generation period.

15. The computer readable non-transitory storage medium of claim 14, the data comprising data for a previous contest from the at least one previous contest generation period that has a same entry fee as the contest.

16. The computer readable non-transitory storage medium of claim 14, the data comprising data from the second portion of the at least one previous contest generation period.

17. The computer readable non-transitory storage medium of claim 14, the computer readable instructions that when executed further cause the processor to:

determine an aggregate number of unfilled entry slots using the number of unfilled entry slots in each available contest instance;

reduce the estimated number of possible contest participants by the determined aggregate number of unfilled entry slots to yield an estimated need for entry slots;

create the additional contest instance in the second portion of the contest generation period to replace the filled contest instance, the additional contest instance having the same number of entry slots as the filled contest instance if the estimated need for entry slots exceeds the filled contest instance's number of entry slots; and create the additional contest instance in the second portion of the contest generation period to replace the filled contest instance, the additional contest instance having a number of entry slots equal to the estimated need for entry slots if the estimated need for entry slots does not exceed the filled contest instance's number of entry slots.

18. The computer readable non-transitory storage medium of claim 13, the computer readable instructions that when executed further cause the processor to:

collect data about contest entry by contest participants in connection with at least one previous contest generation period;

determine whether or not to modify the initial number of instances of the contest using the collected data; and determining, by the computing device, whether or not to modify the maintenance number of instances of the contest using the collected data.

* * * * *